United States Patent [19] [11] 4,388,137

McCarty et al. [45] Jun. 14, 1983

[54] PROCESS FOR TRANSFER COATING WITH RADIATION-CURABLE COMPOSITIONS

[75] Inventors: William H. McCarty, Whitehouse Station; John P. Guarino, Lawrenceville; Frank A. Nagy, Edison, all of N.J.

[73] Assignee: Mobil Oil Corporation, New York, N.Y.

[21] Appl. No.: 174,057

[22] Filed: Jul. 31, 1980

Related U.S. Application Data

[63] Continuation of Ser. No. 967,189, Dec. 7, 1978, abandoned.

[51] Int. Cl.[3] .............................................. B29C 19/02

[52] U.S. Cl. .................................. 156/275.5; 101/33; 101/34; 156/230; 156/231; 156/232; 156/233; 156/234; 156/236; 156/238; 156/241; 156/247; 156/289; 156/344; 156/272.6; 427/44; 427/54.1

[58] Field of Search ............... 156/272, 289, 241, 247, 156/236, 230, 231, 238, 233, 232, 344; 204/159.12, 159.17, 159.13; 427/44, 54.1, 391, 393.5, 388.2, 362, 428, 35, 146, 154, 155, 156; 101/33, 34, 470, 471

[56] References Cited

U.S. PATENT DOCUMENTS

| | | | |
|---|---|---|---|
| 3,437,512 | 4/1969 | Burlant et al. | 427/44 |
| 4,039,722 | 8/1977 | Dickie et al. | 427/54.1 X |
| 4,071,387 | 1/1978 | Schlaepfe | 156/230 |
| 4,072,592 | 2/1978 | Due et al. | 427/44 X |
| 4,113,894 | 9/1978 | Koch | 156/231 X |
| 4,123,309 | 10/1978 | Perrington et al. | 156/234 |

FOREIGN PATENT DOCUMENTS

| | | |
|---|---|---|
| 2619313 | 10/1977 | Fed. Rep. of Germany . |
| 1519493 | 7/1978 | United Kingdom . |

*Primary Examiner*—Michael R. Lusignan
*Assistant Examiner*—Thurman K. Page
*Attorney, Agent, or Firm*—Charles A. Huggett; Michael G. Gilman; Edward J. Trojnar

[57] ABSTRACT

Radiation curable coating vehicles, suitable for transfer coating application and strippable from a variety of carrying webs, can be produced by proper selection of coating ingredients and cured either by actinic radiation or electron beams. Potential crosslink density (as herein defined), glass transition temperature and the relative presence or absence of specific adhesion-promoting functional groups are controlled to arrive at a coating composition having the desired degree of adhesion to the substrate to be coated and the carrying web which is to transfer the coating composition to that substrate.

14 Claims, No Drawings

PROCESS FOR TRANSFER COATING WITH RADIATION-CURABLE COMPOSITIONS

CROSS-REFERENCE TO RELATED APPLICATIONS

This application is a continuation of Ser. No. 967,189 filed Dec. 7, 1978 now abandoned.

BACKGROUND OF THE INVENTION

1. Field of the Invention

This invention is concerned with the formulation of polymerizable coating compositions. It is particularly directed to coating compositions useful for transfer coating application.

2. Description of the Prior Art

The transfer of coatings from carrying webs comprised of silicone release coated paper is well known. The application of this technique using electron beam curing on heat sensitive substrates is described in British Pat. No. 1,519,493.

We have found that radiation curable coatings differ in their adherence to the various plastic, metallic and paper substrates used in commerce. This led to the concept of utilizing this phenomenon to transfer a coating from one substrate having a relatively weak adhesive bond to a second substrate having a stronger bond, as disclosed in U.S. patent application Ser. No. 939,095, filed on Sept. 1, 1978 by L. A. Psaty, now abandoned; and a continuation in part thereof Ser. No. 967,188 filed Dec. 7, 1978 now abandoned.

This practical significance of this transfer coating concept is that low cost substrates readily availble in commerce may be substituted for the expensive release paper currently used as the carrying web for this purpose. Furthermore, the surface texture of the carrying web may be desirably imparted to the cured coating. In this way any of a number of aesthetically pleasing and decorative effects can be produced. In addition, when using a nonporous substrate as the carrying web for transfer of the coating composition to a porous substrate, the quantity of coating required is greatly reduced due to the minimization of wicking of the uncured coating into the porous substrate. The result is a coating which resides largely on the surface of the porous substrate, thus more easily bridging the irregularities of that surface with a minimum of coating material. A particularly good example of this process is the transfer of a coating composition from a polyester web to paper to provide a smooth glossy surface for subsequent vacuum metallization. The metallized surface obtained in this manner is exceptionally shiny and free from flaws and blemishes.

SUMMARY OF THE INVENTION

We have discovered a method whereby coatings may be specifically designed to provide the desired degree of differential adhesive force or "selective adhesion" between two dissimilar substrate surfaces and still provide acceptable adhesion to the substrate of interest. The basic variables controlling the adhesive force have been found to be the crosslink density of the coating, the presence (or relative absence) of specific adhesion promoting sites in the coating composition and/or on the surface of the respective substrates, and the glass transition temperature of the coating. By appropriate manipulation and control of these variables, we are now able to custom design coating compositions to achieve a variety of coating effects on virtually any coatable substrate.

DESCRIPTION OF SPECIFIC EMBODIMENTS

It has been found that by increasing the crosslink density of the coating composition, as conveniently defined by the calculated (i.e., theoretically possible) number of gram moles of potential branch points per 100 grams of coating composition, one may controllably effect a decrease in the adhesive bond strength between the cured coating and most substrates of interest in commerce. Crosslink densities ranging from about 0.02 to about 1.0 have been found to be useful in this regard, but a range of from about 0.03 to 0.7 is preferred and, in particular, a range of between 0.04 and 0.5 is found to be the most useful.

Given a calculated potential crosslink density in the coating composition, the adhesive force between the cured coating and the substrate of interest may be further modified by incorporating into or eliminating from the composition specific chemical groups that influence the adhesive bond to the substrate. Such chemical groups may be broadly classified as Lewis & Bronsted acids or bases, hydroxyl or carboxyl groups combined with organic hydrocarbon molecules, ether linkages, urethane linkages, epoxide groups, mercaptan groups, and so forth.

In addition, it may be beneficial to incorporate adhesion promoting groups on the surface of the substrate on which the cured coating is to remain after stripping away of the carrying web. This may be accomplished by subjecting the substrate of interest to treatment by Corona discharge, by open flame, or by other oxidizing or reducing atmospheres, or by any other suitable chemical or heat treatment. Physical treatment of the surface of the uncoated substrate with abrasives which serve to improve mechanical adhesion may also be used on nonporous substrates to improve the adhesive bond. Incorporation of release agents such as silicone oil, mineral oils, or waxes onto the surface of the carrying web may be used to decrease the adhesive bond, but these generally are not preferred as they tend to increase the cost of the process and are usually not needed to utilize this invention.

An additional factor of importance in the design of the coating compositions encompassed within the scope of this invention is the glass transition temperature (Tg) of the cured coating. Measurement of Tg may conveniently be made by the use of a differential scanning calorimeter, as those skilled in the art will be aware. The Tg is important in that together with the crosslink density it determines the mechanical strength of the coating. For instance, coatings which are too low in Tg may fail cohesively during the stripping operation. Similarly, if the Tg is too high brittle failure of the coating may occur during stripping. It has been found that a Tg falling within the approximate range of from minus 80° C. to plus 100° C. may be useful in the invention, but we prefer that the Tg fall between about minus 20° C. and plus 50° C., and most preferably between about 0° C. and plus 30° C. We find that the latter range provides maximum toughness in the cured coating at room temperature for a given potential crosslink density. However, in many applications considerations of minimum applied coating cost will outweigh maximum toughness, in which case operation outside the above-stated preferred ranges may be desirable.

Another factor to be considered in the design and formulation of the coating composition is the incorporation therein of internal lubricants such as waxes, hydrocarbon oils, and silicones which are generally used in the coatings to reduce the surface coefficient of friction. The incorporation of such internal lubricants into the coating has now been found to be a useful additional tool to control (generally reduce) the adhesive force of the cured coating, thereby facilitating removal therefrom of the carrying web. Care must be taken, however, not to incorporate an undue amount of such materials into the coating composition, as adhesion to the substrate of interest may be adversely affected and it may make the subsequent application of decorative inks or other materials to the cured coating more difficult.

Because of the numerous factors entering into the specific design of the coating composition for use in this invention, we have devised the following procedure for selection of coating and carrying web for use with any coatable substrate of interest. First, the desired physical, chemical and aesthetic properties of the coating required for the intended use on the substrate of inteest should be decided upon and a suitable coating vehicle developed. Application of the coating to various plastic and metal film materials which might be useful as carrying webs is then performed and the coated film material brought into contact with the substrate of interest. The sandwich formed thereby is then subjected to appropriate curing means (electron beam, UV, thermal, etc.) and the coating composition polymerized. The peel force required to strip the carrying web from the coated substrate is then determined.

The carrying webs may be ordered according to the peel force required to separate them from the substrate of interest. In general, it will be found that polyolefin, polyester, and metal films used in commerce will perform exceptionally well as carrying webs exhibiting low peel strengths. The order in the array may be altered by surface treatment. For example, if it is desired to transfer from polyester to polyethylene or metal films, the polyethylene may be subjected to Corona discharge, or the metal film may be cleansed of the oils and soaps used in the manufacturing process by suitable washing, heat treatment, or by Corona discharge treatment.

It will also be found that increasing the crosslink density of the coating will provide lower stripping forces and a correspondingly greater variety of carrying webs. Decreasing the crosslink density will have the opposite effect. In any specific process it is desirable that a compromise between adhesion to the substrate of interest and the carrying web be reached.

It is preferred that the crosslink density of the coating, as defined by the potential number of gram moles of branch points per 100 grams of coating (two branch points equals one crosslink) lie between about 0.03 and 0.7, although the range from 0.02 to 1.0 may also be used with good results. A range from 0.04 to 0.5 is a particularly desirable range. This range provides coatings that demonstrate good adhesion to paper and vinyl film, while releasing acceptably from polyolefin, polyester, and "oily" metal films. The lower portion of the range also includes compositions that adhere well to treated polyethylene and clean metals, while stripping easily from polyolefin, polyester and "oily" metal films.

In case of cure by electron beam, the composition of the carrying web is not critical since penetration by the electrons can be assured by selection of sufficiently high voltage. In the case of cure by ultraviolet light, however, the selection of carrying web must be confined to films that transmit UV light in sufficient intensity to effect the cure of the coating. Thus polyolefins, particularly polyethylene, are preferred for use with UV cure coatings due to the excellent transmission of UV light. The range of materials that can be used as carrying webs can be extended by using UV initiators that absorb strongly in regions where UV transmission is highest.

Thus, polyester film can be used with UV cure coatings by use of photoinitiators such as 2-chlorothioxanthone which absorbs light at the higher wavelengths. Cure speed when using UV light may be further increased by using UV light sources whose radiant output is enhanced at the higher wavelengths.

We have found that essentially all of the various known crosslinking mechanisms for the cure of coatings by electron beam or ultraviolet light are useful with the invention. For example, mixtures of molecules containing one or more ethylenically unsaturated groups that are reactive to polymeriztion by free radicals may be used. In addition, the incorporation of molecules containing one or more mercaptan groups in conjunction with ethylenically unsaturated molecules are useful. Suitable mixtures of ethylenically unsaturated molecules with or without the addition of mercaptans may be cured either by electron beams or ultraviolet light. In addition, mixtures of molecules containing one or more epoxide groups per molecule may be cured by ultraviolet light using appropriate UV sensitive initiators. Such initiators are well known in the coatings art. It is found that polyethylene is a particularly efficient carrying web for use with coatings compositions utilizing the epoxide cure mechanism.

Illustration of the invention is provided by the following examples, wherein Coatings A, B and C are compositions which were curable by electron beam radiation and Coatings D, E, F, G, and H were curable by U.V. light. The reported T-peel values for each coating composition on the various substrates and carrying webs were determined in accordance with ASTM procedure D-1876.

The substrates used for the illustration of this invention are identified in Table I. The same materials were utilized in the experiments as both carrying webs and coatable substrates of interest. Table II comprises a glossary of the nomenclature used in describing the compositions of the various coating vehicles.

TABLE I

SUBSTRATES UTILIZED FOR ILLUSTRATION OF INVENTION

| Type | Description |
|---|---|
| Polyethylene Film | One mil thick film supplied under the trade name VISQUEEN. |
| Polyester Film | One mil thick film; used in manufacture of magnetic tape. |
| Aluminum Foil | Approximately one mil thick Full Hard foil containing the manufacturer's rolling oils. |
| Cleaned Aluminum Foil | Approximately one mil thick dead soft foil. Foil was heat treated to remove rolling oils. |
| Corona Treated Polyethylene | One mil thick film supplied under the trade name VISQUEEN and rendered water wettable by Corona discharge treatment. |
| Vinyl Film | Approximately 10 mil thick film. |
| Paper | 28 pound (per ream) coated |

TABLE I-continued

| SUBSTRATES UTILIZED FOR ILLUSTRATION OF INVENTION | |
|---|---|
| Type | Description |
| | one side. |

TABLE II

NOMENCLATURE

1004
EPON 1004 epoxy resin formed by reaction of epichlorohydrin and 4,4'-isopropylidenediphenol; epoxide equivalent weight of 883 to 1000

1004/A
Reaction product of EPON 1004 and acrylic acid using equivalent quantities of acrylic acid and epoxide groups.

1004/A/M
Reaction product of above with 0.25 moles of maleic anhydride adhesion promoter (U.S. Pat. No. 4,072,592) per mole of EPON 1004 used in 1004/A reaction above-molecular weight approximately 1800-with approximately two reactive acrylate groups per molecule.

828
EPON 828 Diglycidyl ether of 4,4'-isopropylidenediphenol; epoxide equivalent weight of 185 to 200.

828/H
Reaction product between equivalent quantities of epoxides and hydroxyethyl acrylate, molecular weight approximately 616, with approximately two reactive acrylate groups per molecule.

TMPTA
Trimethylol propane triacrylate, mole weight of 299, three reactive acrylate groups per molecule.

BCEA
Butyl carbamyl ethyl acrylate, formed by reaction of equivalent amounts of butyl isocyanate and hydroxyethyl acrylate, mole weight of 215, one reactive acrylate group per molecule.

QM589
Isobornyl acrylate manufactured by Rohm & Haas Co., mole weight 186, glass transition temperature of homopolymer of approximately 85° C., one reactive acrylate group per molecule.

NVP
n-Vinyl pyrrolidone manufactured by GAF Corp., mole weight of 111, glass transition temperature of 80° C., one reactive unsaturated group per molecule.

F-I-4
A chlorinated benzophenone derivative manufactured by Eastman Chemical Company under the trade name F-I-4.

HEA.5P0
An adduct prepared by reacting one mole of hydroxyethyl acrylate with five moles of propylene oxide as described in U.S. Pat. No. 4,064,026. The mole weight was 40 grams and there was one unsaturated group per molecule.

XD9002
An adduct supplied by Dow Chemical Co., formed by reacting one mole of an epoxy resin with two moles of acrylic acid. Mole weight is approximately 400 and there are two unsaturated groups per molecule.

I-651
A photoinitiator supplied by Ciba Geigy Corporation under the trade name IRGACURE 651.

CTX
2-Chlorothioxanthone supplied by Sherwin-Williams Company.

MDEOA
Methyldiethanolamine supplied by Union Carbide Company.

FC504
Photochemically reactive curative for epoxy groups containing compositions supplied commercially by 3M Company.

ERL-4221
Diglycidylether of 4,4'-isopropylidenediphenol-mole weight approximately 374, two epoxy groups per molecule-manufactured by Union Carbide Corporation.

ARALDITE 6004
3,4-epoxy cyclohexyl methyl-3,4-epoxy cyclohexane carboxylate-mole weight approximately 280-two epoxy groups per molecule-manufactured by Ciba Geigy.

RD-2
1,4-butanediol diglycidyl ether-mole weight 268-two epoxy groups per moleculate-manufactured by Ciba Geigy.

Coatings A, B and C

These are coating compositions suitable for cure by means of electron beam radiation. They were formulated using standard formulation techniques and a summary of each, along with the calculated potential crosslink density and the Tg (as determined by differential scanning calorimetry), is presented in Table III.

TABLE III

Electron Beam Curable Coating Compositions

| | Coating | | |
|---|---|---|---|
| Composition, wt. % | A | B | C |
| 1004/A/M | 9 | 7.2 | — |
| 828/H | — | — | 40.5 |
| TMPTA | 10 | 28 | 18 |
| BCEA | 62.5 | 50 | — |
| NVP | 18 | 14.4 | — |
| HEA.5PO | — | — | 40.5 |
| Internal Lubricant* | 0.5 | 0.4 | 1.0 |
| | 100.0 | 100.0 | 100.0 |
| Branch points per 100 gram | 0.11 | 0.29 | 0.31 |
| Tg, °C. | 20 | 25 | −40 |

*All coatings contained a small amount of an internal silicone lubricant to provide acceptable coefficient of friction.

Coating A

Coating A is an example of a coating of relatively low potential crosslink density (0.1). T-peel results obtained for this coating are given in Table IV. These results clearly indicate that the coating may be easily separated from polyethylene, polyester, and oily aluminum foil with peel strengths approaching zero. However, separation from cleaned aluminum, treated polyethylene, or vinyl film proved to be impossible, leading to ripping of the substrate or cohesive failure of the coating.

TABLE IV

T-Peel Readings, gms/inch

Coating A - Applied at 0.5 mil to carrying web and cured in contact with substrate of interest at 5MRAD dose.

| | Substrate of Interest (Coating remains on this substrate) | | | | | |
|---|---|---|---|---|---|---|
| | Polyester | Aluminum Foil as received (oily) | Cleaned Aluminum Foil | Corona Treated Polyethylene | Vinyl Film | Paper |
| Polyethylene | 0 | 0 | 0 | 0 | 0 | 0 |
| Polyester | | 0 | 0 | 0 | 0 | 0 |
| Aluminum Foil - as received - oily | | | 0 | 5 | 0 | 50 |
| Cleaned Aluminum Foil | | | | 400[a] | 120[b] | 200[c] |
| Corona Treated Polyethylene | | | | | 125[b] | 300[b] |
| Vinyl Film | | | | | | 200[c] |

Notes:
[a]Rips polyethylene
[b]Cohesive failure
[c]Rips paper

Coating B

The results obtained for Coating B are given in Table V. Coating B is similar in chemical structure to Coating A with the major change being an increase in TMPTA level to provide a crosslink density of 0.29. This change produces a coating which separates easily from cleaned aluminum, providing yet another potential carrying web. Further increases in crosslink density could be made to include treated polyethylene as a carrying web.

TABLE V

T-Peel Readings, gms/inch

Coating B - applied at 0.5 mil to carrying web and cured in contact with substrate of interest at 5MRAD dose.

| | Substrate of Interest | | | | | |
|---|---|---|---|---|---|---|
| Carrying Web | Polyester | Aluminum Foil as received (oily) | Cleaned Aluminum Foil | Corona Treated Polyethylene | Vinyl Film | Paper |
| Polyethylene | 0 | 0 | 0 | 0 | 0 | 0 |
| Polyester | | 0 | 0 | 0 | 0 | 0 |
| Aluminum Foil - as received - oily | | | 0 | 0 | 0 | 0 |
| Cleaned Aluminum Foil | | | | 10 | 10 | 10 |
| Corona Treated Polyethylene | | | | | 450[a] | 75 |
| Vinyl Film | | | | | | [b] |

Notes:
[a]Rips polyethylene
[b]Rips paper

Coating C

Coating C provides an additional illustration of the invention for coatings with Tg below the preferred range but still within the scope of the invention. The T-peel results obtained for release from the same substrates as used previously but in contact with paper only are given in Table VI. These results are listed using the same order of substrates as used in the previous Tables. However, while Coating C has a crosslink density only slightly higher than that of Coating B, the separation from the substrate is not as easily performed. In general, it will be found that low Tg coatings will tend to adhere to most substrates to some extent. This adherence is due to the extreme softness of these coatings, which can lead to blocking in the roll or difficulty of obtaining easy release. For this reason, it is most preferable to control the Tg from 0° to 30° C., which provides coatings of optimal release properties and toughness in the cured film.

TABLE VI

T-Peel Readings, gms/inch

| Carrying Web | Substrate of Interest Paper |
|---|---|
| Polyethylene | 100 |
| Polyester | 5 |
| Aluminum Foil, as received, (oily) | 50 |
| Cleaned Aluminum Foil | 15 |
| Corona Treated Polyethylene | 130[a] |
| Vinyl Film | [b] |

Notes:
[a]Almost rips paper
[b]Rips paper

Coatings D, E, F and G

Four ultraviolet light curable coating compositions, along with their respective calculated potential crosslink densities and Tg values, are given in Table VII below. As with the foregoing examples, these compositions were formulated using standard formulation techniques.

TABLE VII

Ultraviolet Light Curable Coating Compositions

| | Coating | | | |
|---|---|---|---|---|
| Composition, wt. % | D | E | F | G |
| 1004/A/M | — | 15 | — | — |
| 828/H | 37 | — | — | 38.9 |
| XD9002 | — | — | 38 | — |
| TMPTA | 20 | 2.5 | — | 17.3 |
| BCEA | — | 37.5 | — | — |

TABLE VII-continued

| Ultraviolet Light Curable Coating Compositions | | | | |
|---|---|---|---|---|
| | Coating | | | |
| Composition, wt. % | D | E | F | G |
| NVP | — | — | 18.5 | — |
| HEA.5PO | 37 | — | — | 38.9 |
| QM589 | — | 38 | 38 | — |
| Internal Lubricant* | 1 | 1 | 0.5 | 0.9 |
| F-I-4 | 5 | 4 | 5 | — |
| I-651 | — | 2 | — | — |
| CTX | — | — | — | 1.0 |
| MDEOA | — | — | — | 3.0 |
| | 100.0 | 100.0 | 100.0 | 100.0 |
| Branch points per 100 grams | 0.31 | 0.042 | 0.19 | 0.24 |
| TG, ° | −40 | 40 | 80 | −40 |

*All coatings contained a small amount of an internal silicone lubricant to provide acceptable coefficient of friction.

Each of the coatings was applied to carrying webs of polyethylene, polyester, and corona treated polyethylene at 0.15 mil and cured in contact with a paper substrate at 25 ft/min/lamp using a bank of four mercury filled lamps (two lamps operated at 300 watts/inch and two lamps operated at 200 watts/inch). The results are summarized in Table VIII. All of these coatings fall outside the preferred range of Tg, but still within the range acceptable in this invention. All coatings cured well, as indicated by an absence of tackiness after cure, and released easily from the polyester and polyethylene films employed as carrying webs. However, Coatings E and F, having relatively high Tg, demonstrated a tendency toward brittle failure during stripping as illustrated by the attempts to transfer from Corona treated polyethylene. For this reason, it is preferred to keep the Tg of the coating between about 0° and about 30° C.

TABLE VIII

| Transfer Results for Ultraviolet Curable Coatings | | | |
|---|---|---|---|
| | Carrying Web | | |
| Coating | Polyethylene | Polyester | Corona Treated Polyethylene |
| D | Easy release | Easy release | Rips paper |
| E | Easy release | Easy release | T-peel = 113 gm/inch Brittle Failure-Adhesion to both substrates |
| F | Easy release | Easy release | T-peel = 60 gm/inch Brittle Failure-Adhesion to both substrates |
| G | Easy release | Easy release | Rips paper |

Coating H:

A coating composition was formulated to demonstrate the invention as applied to coatings cured by crosslinking through an epoxy function. The coating composition was obtained by blending 19.9 parts by weight of FC504, 60.6 parts of ERL-4221, 14.0 parts of ARALDITE 6004, 5 parts of RD-2 and 0.5 parts of an internal silicone lubricant. The composition was applied to carrying webs of polyethylene and polyester films and cured in contact with paper via U.V. light as described previously. The cure was found to be complete under the conditions utilized and release of the coated paper from the carrying webs was easy and complete. The utility of coating compositions embodying the epoxy cure mechanism in the present invention is thereby clearly demonstrated.

In the ultraviolet cure examples described above, the photoinitiator levels were selected based on the levels required for cure in direct contact with an oxygen-containing atmosphere. In this regard it should be noted that the cure of coatings by means of free radical polymerization is inhibited by oxygen. Similarly, the cure through epoxy groups is inhibited by water vapor. Since the preferred use of the invention presents a barrier against the ambient atmosphere during the curing stage, the level of photoinitiator may be reduced substantially while maintaining full cure of the coating. This is a significant advantage inherent in the invention, especially since the photoinitiators available in commerce are usually more expensive than the other coating ingredients. In order to demonstrate this aspect of the invention, the initiator levels in Coatings D, E and F were reduced to the 1% level and the previously described transfer coating experiments repeated. The results were substantially the same as those recited in Table VIII. Alternatively, the cure speed may be increased while maintaining the higher initiator levels. The choice between these two alternatives (i.e.—lower cost vs. higher curing rate) should best be determined by the economics of the process in which the invention is utilized.

Another advantage of the invention is illustrated in the example that follows.

When transferring a coating from a carrying web, it is found that the surface texture and appearance of the carrying web is imparted to the coating. Thus, if the carrying web was smooth and glossy, the coating would have the same appearance. To demonstrate this effect, Coating C was applied to polyester film and cured in contact with paper. After stripping the polyester, the gloss of the coated surface of the paper was measured on a Glossmeter at a 60° angle. The gloss of the coating was found to be 75%, which was substantially the same as that of the polyester film.

To further demonstrate this effect, the polyester film was roughened by rubbing steel wool against the surface. The coating was then applied to the roughened surface and transferred to a paper substrate as before. The gloss of the coated surface of the paper and that of the roughened polyester film were found to have substantially the same reading of 53%. This result was further substantiated by transfer from a dull aluminum foil carrying web.

These results are of great practical significance, since it allows the production of protective coatings that possess the low sheen required in applications such as wall coverings, vinyl upholstery and wall panels. In the past, this low sheen appearance has been obtained by incorporation of transparent pigments such as finely divided silica into the coating composition. However, incorporation of such agents often results in difficulty in application of the coating, thereby resulting in poor appearance in the product.

The invention is also useful for the production of coatings having a superior gloss and smoothness suitable for subsequent metallization. To demonstrate this aspect of the invention, Coating C was applied directly to paper by direct roll-coating and cured by electron beam radiation. A second sample was prepared by transferring the same coating composition from a polyester film carrying web to another identical paper substrate and curing. After vacuum metallization of the cured coating the appearance of the two metallized surfaces were compared. While gloss readings could not be obtained due to the spectral reflection of the metal, the difference in brightness of the two surfaces was readily perceivable by the eye. The metal film deposited on the coating transferred from the polyester film presented a much brighter, cleaner appearance.

The utilization of the invention to transfer a coating that is applied in a pattern to the carrying web is another desirable aspect. This was demonstrated by pigmenting Coating C with titanium dioxide at the 40% level by weight. The pigmented coating composition was applied as a stripe on polyester film, transferred to paper and cured. The stripe of pigmented coating transferred easily and cleanly to the paper.

Although the concept disclosed herein has been illustrated with reference to certain specific embodiments, it should be understood that modifications and variations may be made thereon without departing from the spirit of disclosed invention, as those skilled in the art will readily understand. Such modifications and variations are therefore considered to fall within the purview and scope of the appended claims.

We claim:

1. A process for applying a coating to a thin porous substrate and reducing absorption of said coating into said substrate, said process comprising:

(a) applying a radiation-curable composition to a carrying web; said radiation-curable coating composition having a crosslink density of 0.11 to about 1.0 determined by calculation of the gram moles of branch points per 100 grams of uncured coating; a glass transition temperature of the radiation cured coating within the approximate range of −20° C. to 50° C.; and containing internal lubricant incorporated therein in an amount sufficient to facilitate removal of the cured coating from a carrying web substrate without adversely affecting adhesion of the cured coating to said solid substrate; said carrying web being of a nature such that said coating composition, when cured, will not adhere to its surface;

(b) bringing a thin porous substrate to which said coating composition will adhere into contact with said coating composition on said carrying web to form a sandwich;

(c) subjecting said sandwich to a radiation curing process wherein said coating composition is polymerized and set on the surface on said porous substrate; and (d) stripping said carrying web away from the layer comprising said cured coating composition.

2. The process of claim 1 wherein said glass transition temperature is between 0° C. and plus 30° C.

3. The process of claim 1 wherein said curing process is by means of electron beam radiation and said coating composition is conducive to curing by electron beam.

4. The process of claim 1 wherein said curing process is by means of ultra violet light radiation and said coating composition is conducive to curing by ultra violet radiation.

5. The process of claim 1 wherein said curing process is by means of thermal radiation and said coating composition is conducive to curing by thermal radiation.

6. The process of claim 1 wherein said carrying web forms an endless belt such that said web is automatically stripped from the surface of said coated porous substrate subsequent to said curing process and recoated with said uncured coating composition for reuse in the process.

7. The process of claim 1 wherein said thin porous substrate is paper.

8. The process of claim 1 wherein said carrying web comprises a plastic film material.

9. The process of claim 8 wherein said plastic film comprising polyester sheet material.

10. The process of claim 1 wherein said web is metal.

11. The process of claim 10 wherein said metal web is in the form of metal foil.

12. The process of claim 1 wherein the surface of said carrying web to which said coating composition is applied has a high degree of smoothness.

13. The process of claim 1 wherein the surface of said carrying web to which said coating composition is applied has a predetermined texture, which texture will be transferred to the cured coated surface of said cured and coated substrate.

14. The process of claim 1 wherein said carrying web has a design to its surface to which said coating composition is applied, which design is transferred to the cured surface of said cured and coated substrate.

* * * * *